June 18, 1963
R. J. PURTELL
3,094,282
IRRIGATION SYSTEM
Filed March 14, 1961
4 Sheets-Sheet 1
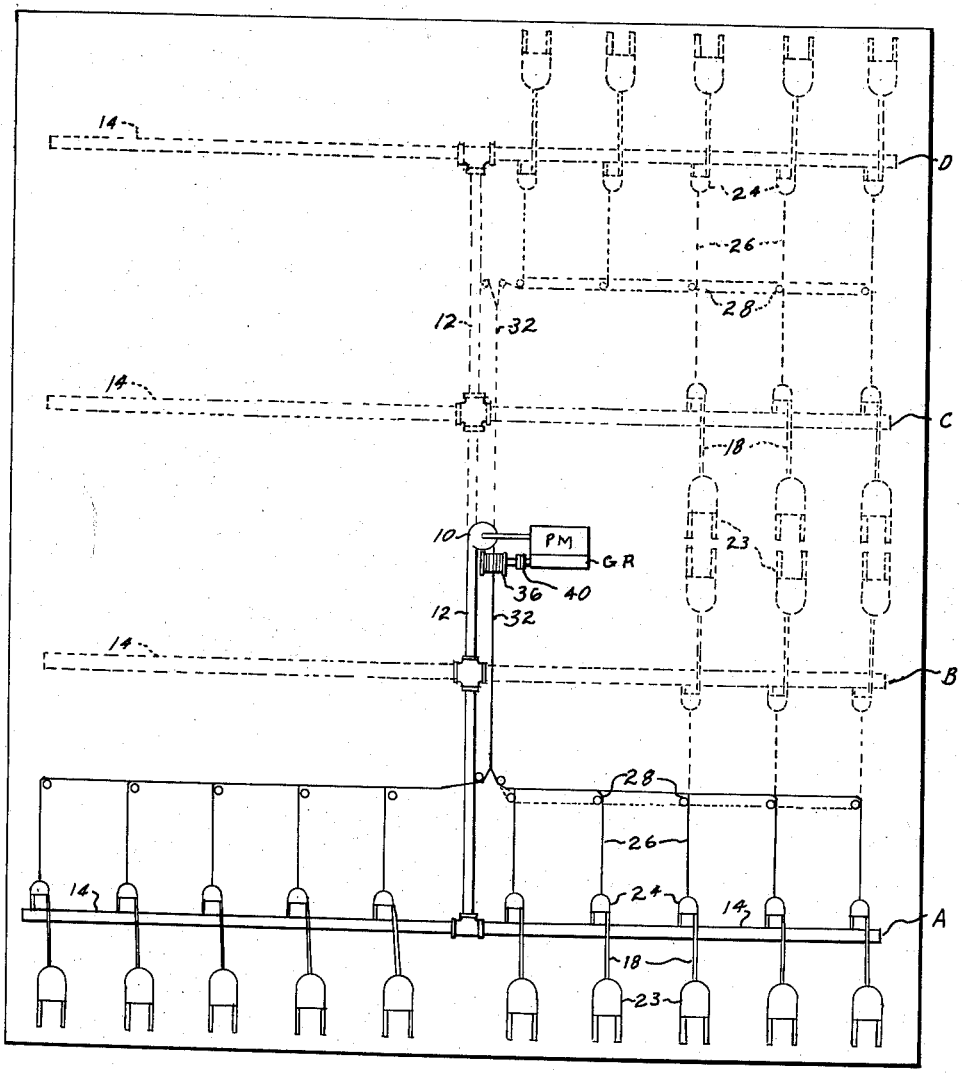
FIG. I
Rufus J. Purtell
INVENTOR.
BY
Atty.

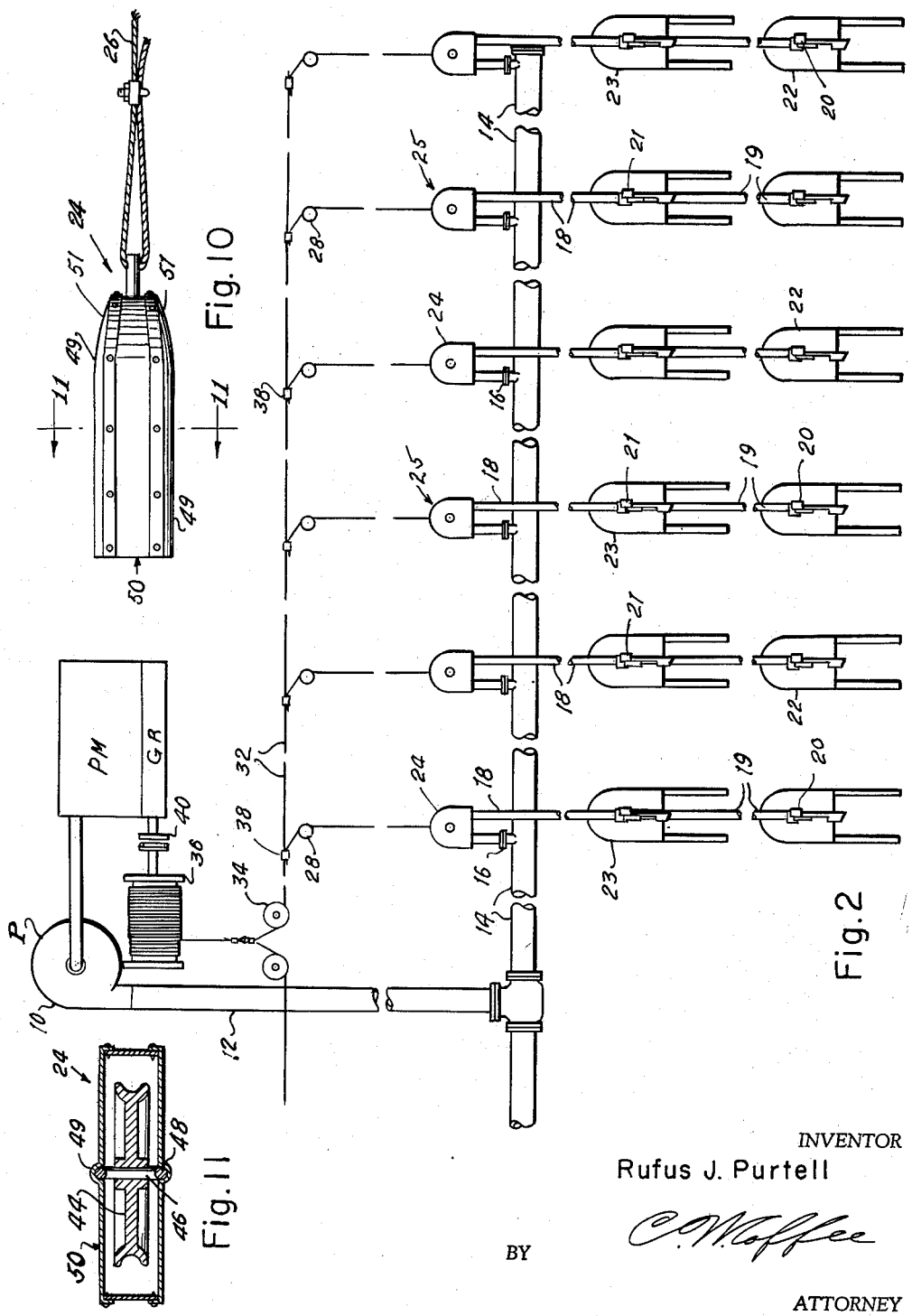

June 18, 1963
R. J. PURTELL
3,094,282
IRRIGATION SYSTEM
Filed March 14, 1961
4 Sheets-Sheet 3
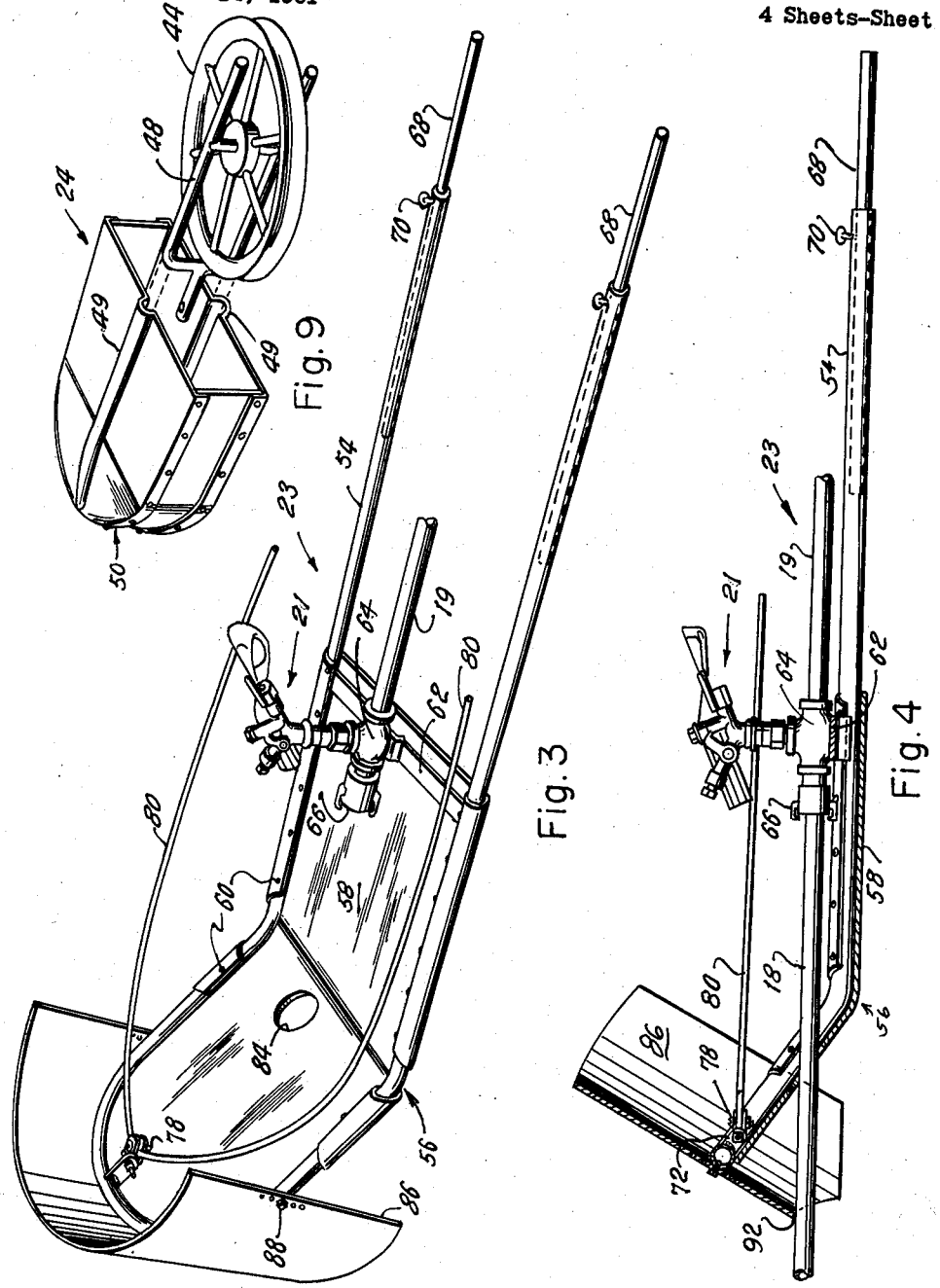
INVENTOR
Rufus J. Purtell
BY
ATTORNEY June 18, 1963
R. J. PURTELL
3,094,282
IRRIGATION SYSTEM
Filed March 14, 1961
4 Sheets—Sheet 4
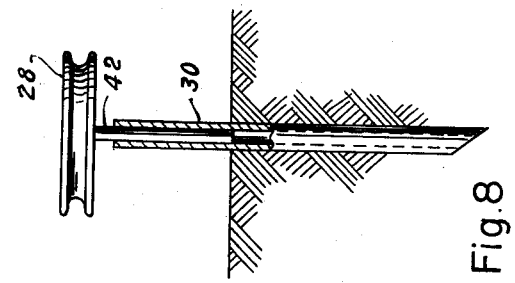
Fig. 8
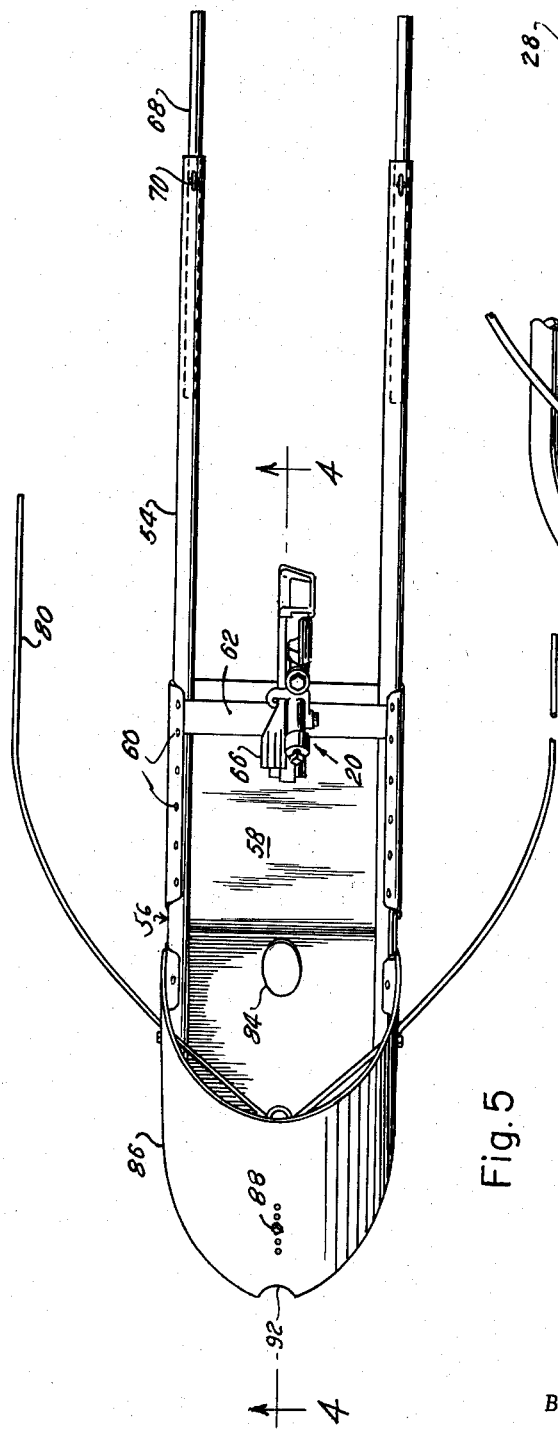
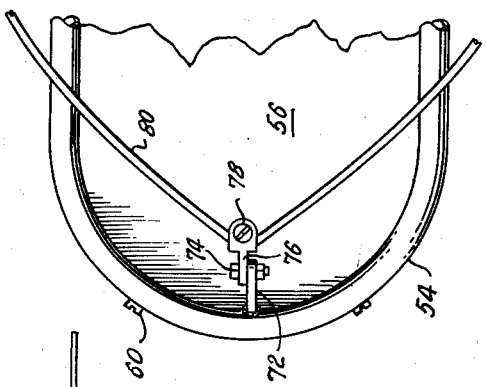
Fig. 6
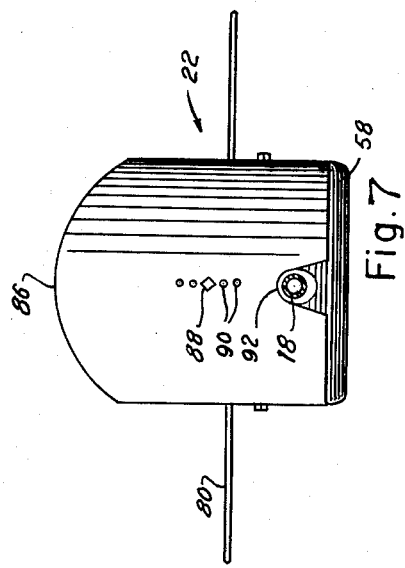
Fig. 7
INVENTOR
Rufus J. Purtell
BY *C. W. Coffee*
ATTORNEY

United States Patent Office 3,094,282
Patented June 18, 1963

3,094,282
IRRIGATION SYSTEM
Rufus J. Purtell, Brownfield, Tex., assignor to Robert B. Knight, J. B. Knight, and Jean Knight Jones, doing business as J. B. Knight Company, Brownfield, Tex.
Filed Mar. 14, 1961, Ser. No. 95,645
19 Claims. (Cl. 239—213)

This invention relates to agricultural irrigation of the sprinkler type and more particularly to a method and means for moving the sprinklers to different locations in the field where the watering is being performed.

As practiced today, most agricultural sprinkler type irrigation is performed with a large diameter coupled pipe extending through the field with sprinklers directly attached to the pipe. After the particular area where the large diameter coupled pipe is located is watered, the water is turned off; the pipe is drained, uncoupled, picked up, moved to a new location, recoupled, filled with water, and the irrigation is begun again. Obviously this is a time consuming and expensive operation involving a loss of considerable water. The lost water is not beneficially applied and causes an excessively muddy condition. Furthermore, time is consumed refilling the pipe.

Through the years, various systems have been devised and become commercially available. Generally, these systems are characterized by a plurality of sprinklers connected directly upon a single pipe. There is difficulty in moving the system. The water trapped in the large diameter pipe makes the system as a whole rather heavy, therefore, requiring massive equipment to move it.

Another characteristic of the prior art systems is that generally the pipe is moved at right angles to the axis of the pipe, and this necessitates elevating the pipe above ground for movement.

Accordingly for this invention, the sprinklers are not connected directly to the main pipe but are connected by pliable pipes of considerable length. To move the sprinkler, the pliable pipe, which is laid parallel to the axis of travel of the sprinklers is merely dragged forward rather than transversely as in the past. Therefore, the pliable pipe may remain on the ground while being moved. Furthermore, since each pliable pipe has only a limited number of sprinklers to supply, it may be of a small diameter thus reducing the weight appreciably.

An object of this invention is to provide a readily, easily movable agricultural irrigation system.

Another object of this invention is to provide an agricultural irrigation sprinkler system automatic in operation.

Another object is to provide an agricultural irrigation system requiring small amounts of power to move the sprinklers.

A further object is to provide an agricultural irrigation system wherein the water filled elements at all times are supported by the ground eliminating the necessity of a supporting structure.

A further object is to provide an irrigation system whereein the time rate of application of water to the soil is less than heretofore economically obtainable.

A further object is to provide an agricultural irrigation system which is adapted to be moved along its axis during operation thus eliminating lost time while the system is not irrigating.

A further object is to provide an agricultural irrigation system by which many of the presently used systems may be converted to the new system without discard of equipment presently used.

Still further objects are to achieve the above with a system that is sturdy, compact, durable, simple, light weight, and reliable, yet inexpensive and easy to manufacture.

The specific nature of the invention as well as other objects, uses, and advantages thereof will clearly appear from the following description and from the accompanying drawings, the different views of which are not necessarily to the same scale, in which:

FIG. 1 is a schematic representation of an entire farm with the system as it would be located in four positions to irrigate the entire farm.

FIG. 2 is a schematic representation of the system as it would be used in one position on the farm. It will be understood that in FIGS. 1 and 2 many of the lengths are foreshortened to show the entire system schematically.

FIG. 3 is a perspective view of one of the sleds as it would be used in the practice of this invention.

FIG. 4 is an axial sectional view of one of the sleds taken on line 4—4 of FIG. 5.

FIG. 5 is a plan view of one of the sleds as seen in FIG. 3.

FIG. 6 is a detail of the front of the sled with the fender removed.

FIG. 7 is a front elevation of the sled with the fender attached.

FIG. 8 is a detail of one of the staked posts partially in section.

FIG. 9 is a detail of one of the traveling blocks with the pulley shown removed from the shell.

FIG. 10 is a side elevation of one of the traveling blocks.

FIG. 11 is a sectional view of one of the traveling blocks taken on line 11—11 of FIG. 10.

In the drawing it may be seen that pump 10 might be connected to a reservoir of water. The reservoir may be either a surface supply or sub-surface supply. The pump is driven by prime mover "PM" and forces the water under pressure from the reservoir into manifold line 12. The line extends to first lateral or header 14 which may project laterally to either or both sides of line 12. The header 14 may be moved. However, during the irrigation of a particular field it remains stationary. Pliable movable, lateral pipes or conduits 18 are temporarily placed on top of the ground and connected to the header 14.

The header 14 has a plurality of connections or couplings 16 by which the pliable lateral pipes 18 are attached thereto. The connections 16 are of the quick coupling type. The pliable lateral pipes 18 are of relatively small diameter. I contemplate that they would be made from a light weight synthetic plastic material or the like. The characteristic of pipes 18 could be described as supple, or flexible as well as pliable. For each individual pliable lateral pipe 18, the header 14 is a source of water under pressure.

Sprinkler 20 is at the extreme end of each pliable lateral pipe 18. Sprinkler 21 is connected to each pliable lateral pipe 18 near sprinkler 20. These sprinklers 20 and 21 are identical and are commercially available on the market in a variety of sizes and capacities, and are well known to the art. Therefore, they will not be described further except that they are of a type which discharge the water a considerable distance from the sprinkler and over an arc of 360 degrees in all directions uniformly. As will be discussed later, it is intended that there be a uniform discharge of water between the various sprinklers.

Each sprinkler 20 is mounted upon sled 22 and each sprinkler 21 on sled 23. The sleds 22 and 23 will be described in detail later. Each sled is a vehicle for carrying the sprinkler.

Operation

For illustrative purposes it will be assumed that water pressure and sprinklers 20 and 21 are being used that will discharge water for over twenty feet from the sprinkler. If a row of sprinklers is set twenty feet from the edge of the farm, and forty feet between sprinklers; the land from the edge of the farm to forty feet from the edge will be sufficiently uniformly irrigated.

In a typical operation the farmer would have the header 14, pliable lateral pipes 18, and sleds 22 and 23 with sprinklers 20 and 21 loaded upon a wagon or other vehicle adapted to be pulled through the field by a tractor. He would propel the wagon through the field along the line where the header 14 would be located, for example line A, FIG. 1, and discharge the individual sections of header 14, the pliable lateral pipe 18 and sprinkler sleds 22 and 23 along this line as needed. The header pipe would be 5 or 6 inch diameter aluminum pipe as presently customarily used in sprinkler irrigation. It would be connected to the manifold line 12 and thus to the pump 10.

The sleds 22 would be positioned twenty feet from the edge of the area to be irrigated. The sleds 23 would be located on the pliable lateral pipes 18 forty feet from the sleds 22. The distance between connections 16 and therefore between pliable lateral pipes 18 would be forty feet. The pliable lateral pipes 18 would be connected by connections 16 to the header 14. The header would be positioned so that the connections 16 pointed away from the sleds 22 and 23 in their original position. From the connections 16 the pliable lateral pipe 18 would extend in this direction to loop 25 (FIG. 2) and back parallel to itself to the sled 23.

The pump 10 would be started and the irriagtion commenced.

After the land eighty feet from the edge of the area was irrigated, the farmer would pick up each pliable lateral pipe 18 at the area of the loop 25 and advance the loop 25 a distance of forty feet from its original location. This would move each sled 22 and 23 eighty feet from its original location. The farmer would drag the pliable lateral pipe 18 axially and move the sleds 22 and 23 in tandem. The sprinklers 20 and 21 are now in position to water the next area of land.

It will be noted that the farmer is on dry land when he moves the sprinklers 20 and 21. The pliable lateral pipes 18 are small in diameter and light weight and may be moved axially along the ground full of water. Irrigation continues during the move.

Perhaps most important, it is economically possible to apply water at half the rate formerly possible, i.e., each sprinkler discharges half as much water. For example, assume that the forty foot spacing between sprinklers is the maximum available for the water pressure available. Also assume the farmer wishes to reduce by half the time rate water is applied to the soil and operates pump 10 at full capacity (an economic necessity). By the old system of sprinkler attached directly to header 14, he would have to buy more header 14 and more sprinklers to apply water at a slower rate. By applying the water at a slower rate he is assured of soil absorption in clap type soils. Also he avoids moving the sprinklers in the middle of the night, a most unpleasant chore. Most present day sprinkler systems are designed to be moved every 4 to 6 hours.

After 3 or 4 days, successive moves will bring sled 23 adjacent the loop 25 (during the last move the farmer will get wet but he does not have to bog through soggy ground). Thereafter, the pump 10 is stopped, the system drained, the pliable lateral pipes 18 disconnected from the header 14, and the header 14 uncoupled. The wagon is propelled along the header 14 and it is loaded and moved by wagon to line B, FIG. 1, there to be discharged. The loop 25 is advanced until the pliable lateral pipe 18 may again be connected to connection 16. The sleds will be advanced the regular interval, the pump started and the irrigation recommenced. It will be noted the header 14 did not have to be moved by hand as at present because of the boggy condition along the header 14 immediately after watering and draining.

Alternate Operation

Block or traveling pulley 24 is mounted on each pliable pipe 18 between the point it is connected to the header 14 and sprinkler 20. Each pliable pipe 18 extends out from the connection to the block 24, reeves through the block 24, and then extends back along itself or parallel to its former course to the sprinklers 20 and 21. A lateral cable 26 is attached to each block 24. The cable extends in the direction of travel of the sleds 22 and 23 from the block 24.

Each lateral cable 26 passes about a pulley 28. The several pulleys 28 form a set of parallel in-line pulleys. Each pulley 28 is mounted upon stake 30 which is driven into the ground in a line parallel to the header. Cables 26 are connected to main cable 32 which extends up to the staked pulleys 28. This main cable 32 passes about a master staked pulley 34 which guides main cable 32 to windlass drum or winch 36. The windlass drum 36 is mounted proximate pump 10 and therefore the same prime mover "PM" that furnishes power to pump 10 also furnishes power to the windlass drum 36 through gear reducer "GR" and manually operable friction clutch 40. Under one type operation, the windless drum 36 turns at a low speed continuously during the watering operation. As the windless drum turns it winds in the main cable 32. As each of the cables 26 are spliced or clamped by clamp 38 to the main cable 32, they will draw blocks 24 and consequently sleds 22 slowly towards the pulleys 28. As the header 14 is of considerably larger diameter than the pliable pipes 18, it will contain more water and have more weight. Therefore, the header pipe 14 will effectively anchor those ends of the pliable pipes 18 at couplings 16. Thus, as the blocks 24 advance, the pliable pipes 18 will reeve therethrough, causing the vehicles 22 and 23 to advance bringing the sprinklers 20 and 21 with them.

From the start of the pump 10, water is furnished under pressure to the manifold line 12, the header 14, the pliable pipe 18, and ultimately to the sprinklers 20 and 21 at the end of each pliable pipe 18. When the vehicles 23 reach the header pipe 14 they will drag over the header pipe 14 and continue on the other side of the header pipe 14 until engagement with the blocks 24.

At that time the prime mover "PM" is stopped, the lines 12 and 14 drained, the header line 14 disconnected, the wagon driven along the header line 14 and the header line 14 loaded onto the wagon along its location in the field along with the pliable lines 18 and sprinkler sleds 22. Then the entire system is moved to the next field to be irrigated. It will be noted that by the time the field is completely irrigated, there will be sufficient lapse of time for the soil next to the header line to be sufficiently dry to drive the wagon along the header line to load the header line on it. Therefore, hand transportation over any distance of the header line is eliminated.

Details of Construction

The windlass drum 36 and pump 10 are conventional except for the fact that the connection between the prime mover "PM" and the windlass drum 36 contains friction slip clutch 40 so that if an attendant is not present at the time a block 24 engages pulley 28, that the drive to the windlass drum 36 slips and no damage is done. Since the slip clutch 40, prime mover "PM," gear reducer "GR," and windlass drum 36 are individually old, they have been shown only schematically.

As best shown in FIG. 8, the stake 30 is in the form of a pipe or other tubular member. The pulley 28 is mounted by bearings upon shaft 42. The outside diameter of the shaft 42 is only slightly smaller than the inside diameter of the stake 30. The pulley is connected to the stake by sliding the shaft 42 within the stake 30. This connection is sufficiently secure for these purposes, As best shown in FIGS. 9, 10, and 11, the block 24 includes cover or cape or shield or shell 50 surrounding sheeve 44, which is grooved along its perimeter. The width of the groove is about the same as the diameter of the pliable pipe so that the pipe snugly fits in place and avoids sharp bends or kinks which would restrict the flow of water through the pliable pipe 18. The sheeve 44 is mounted for rotation upon pin 46 which is part of frame 48. The lateral cable 26 is connected to the frame 48. Shell 50 slides along the frame 48, the frame 48 has rod elements which slide in grooves 49 formed in the sides. The shell 50 is wider than it is thick and it is spherically beveled at 51 towards the front, which has a hole therethrough large enough for cable 26 to pass through. Therefore, it may be seen that the shell 50 as a whole may be slid up the cable 26 away from the sheeve 44. I.e., the shell 50 may be moved relative to the frame 48 with its sheeve 44. The shell 50 may be moved while the cable 26 is still attached to the rod frame 48. It is not necessary to remove the cable from the rod frame, because the hole in the shell 50 is large enough for cable 26 to pass therethrough. Therefore, there is complete access to the sheeve 44 for reeving the pliable pipe 18. However, in operation, the shell 50 is slid back so that it covers the block 24. It may be seen that the block 24 will then slide through the field somewhat like a sled aided by the curved front. There is no possibility of the block 24 becoming fouled because the shell 50 covers the block 24 thus preventing foreign matter from getting in it as it is drug along. Also it will be noted that the block 24 travels in the direction of the cable 26 and therefore, it presents a smooth forward surface. It will be seen that if the mechanism were drawn the other way that there would be possibility of catching debris within the sheeve.

Looking down from the top (as in FIG. 5), the sled 22 (and duplicate sled 23) has a U-shaped frame 54 formed of tubular material. Looking at this U-shaped frame 54 in side elevation (FIG. 4) it will be noted that the front end angles upward at 56. A sheet metal bottom 58 is attached to the frame 54 from the front to about half way to the end of the frame forming a flat bottom. The frame 54 behind the sheet metal bottom 58 resembles runners. The sled 22 bears some resemblance to a snowshoe.

The bottom 58 is attached to the tubular frame 54 by bending the edges of the sheet metal up around the tubular frame 54 and connecting it with self taping screws 60. Bar 62 extends from one runner of the U-frame 54 to the other approximately half-way the length of the sled 22. This bar 62 acts to brace the two runners and as a platform for mounting the sprinkler 20. The bar 62 is attached to each runner of the U by welding or otherwise. Pipe T 64 or T conduit is welded to the bar 62. One opening of the T 64 points forward, one backward, and the other opening of the T points upward. Quick coupling type pipe adaptor 66 is screwed into the forward facing opening. The adaptor 66 is means for forming a quick connection between pliable pipe 19 and the pipe T 64 on the sled 22 (or pipe 18 on sled 23). The sprinkler 20 (or sprinkler 21 on sled 23) is screwed into the upward turned opening. The rear sled 22 of the tandem has a plug in the rear facing opening of the T 64. The rear facing opening of the T on the forward sled 21 has pliable pipe 19 connected in it, which is connected in the forward facing opening of the sled 22 at T 64.

Telescope extensions 68 slide inside the rear of the tubular elements forming the frame 54 of the sled 22. They are held in adjusted position by set screw 70. By means of these extensions the exact length of the sled may be lengthened or shortened according to the desires of the operator.

Tab 72 (FIGS. 4 and 6) is welded to the forward end of the frame 54. The tab 72 extends rearwardly from the frame 54 at this point. Bolt 74 extends through a hole in the tab 72. Angle clip 76 is attached to the tab by the bolt 74. Bolt 74 is on a horizontal axis. The clip 76 has two holes one of which is horizontal and the other vertical. The horizontal hole is the one through which bolt 74 passes. Bolt 78 extends through the vertical hole in the clip 76 to hold feelers 80. These feelers are spring steel rods which extend outward and then are curved parallel with the longitudinal axis of the sled. Each has a washer attached by welding or otherwise at the forward end. The bolt 78 extends through this washer so that the feelers 80 may be attached in adjusted position. Therefore, it may be seen that if it is desired the feelers 80 may extend close to the ground far out to help to stabilize the sled 22 as it slides over rough ground. Bolt 74 could be loosened and the clip rotated downward so that the ends of the feelers 80 are about the same level as the bottom of the sled 22. Then the feelers 80 could be adjusted outward by loosening bolt 78 to their largest extended position laterally of the sled 22.

On the other hand if the sled 22 were being operated through a growing crop and it was found desirable to guard the sprinkler 20 from being fouled with vegetation, the bolt 74 could be loosened and the clip 76 rotated so that the feelers 80 extend approximately horizontally or are angled up somewhat. They could be adjusted inwardly to the desires of the operator. Therefore, it may be seen that they would act as a guard to prevent the fouling of the sprinkler 20. It will be understood that the feelers 80 can be adjusted or used in dual function; (1) as outriggers to prevent the sled from tipping over on rough ground, and (2) as guards to prevent debris from fouling the sprinkler 20. It will be noted from the drawings that feelers 80 extend from the front of the sled 22 past the sprinkler 20 which is about half-way back to the sled 22 and on back to about three-fourths the length of the sled 22 without the extension 88.

The sheet metal bottom 58 has a hole 84 through it for the pliable pipe 18 to extend from the forward opening of the pipe T 64. This hole is made by cutting a hole about the diameter of the pipe through the sheet metal bottom 58 and then cutting tabs around the perimeter of this hole and bending the tabs back on the sheet metal to reinforce it at this point. The hole is cut in sheet metal 58 in the middle of the sled 22 and at that point where the frame 54 angles upward at 56. Therefore, it may be seen that when the sled 22 is being pulled it is being pulled from near the bottom of the sled 22. This is particularly important when the sled 22 crossed over the header pipe 14. The pliable pipe 18 already extends over the header pipe 14 and will lift the front end of the sled 22 over the pipe 14. Also, on rough ground there is no problem with the front end of the sled 22 bogging down.

Auxiliary fender or shield 86 (best shown in FIGS. 3 and 7) may be attached to the front of the sled 22. This fender 86 is in the form of a hemi-cylindrical element of sheet metal. The sheet metal fender 86 is attached to the front or nose of the sled so that the axis of the hemi-cylindrical element is normal to the upturned portion of the frame 54. Therefore, the fender 86 somewhat angles upward and rearward in the attached position. The fender 86 acts much the same as the fender on farm tractors when harvesting crops. The fender 86 is attached to the frame 54 by three self taping metal screws 88 which extend through holes 90 in the shield 86 and into the frame 54 of the sled 22. As may be seen, the holes 90 are arranged in rows, one vertical row along the very front of the sled 22 and the other two along each side of the sled 22. The bottom of the fender 86 is angled so that when attached it is horizontal. The front bottom edge is notched at 92 so that it will permit the pliable pipe 18 to ride thereunder. When the sled 22 is being operated on smooth ground with the stubble of growing plants or in growing plants, the fender will tend to push them aside allowing smooth operation of the sled 22. However, it is contemplated that if the sled 22 were to be operated on rough ground with no growing crop (e.g. a preplanting irrigation operation), the sled would be operated without the fender 86 attached.

Various modifications will readily suggest themselves to those skilled in the art. It has already been suggested that the blocks 24 and the cables 26 and 32 could be eliminated and the pliable pipe 18 pulled by hand. Also instead of having the windlass drum 36 turned constantly at a slow rate of speed it could be geared to turn relatively fast and then the friction clutch 40 engaged when it was desired to move the sprinklers 20 and 21 from one location to another and then disengaged to let the sprinklers remain stationary while the watering operation was being performed. Another alternate system of operation would be to retain the block 24 and eliminate the cable 26. A portable winch would be moved to each of the locations and attached to the block 24 and the block 24 moved the necessary amount.

Another modification that might suggest itself is to mount a block similar to the block 24 upon a moving carriage. Therefore, when it is desired to move the sprinklers 20 and 21 the moving carriage would be positioned near the loop heretofore mentioned, the pliable pipe 18 reeved on the block similar to 24, the block advanced the desired amount, and then the pliable pipe disengaged from the block 24. Using the tandem vehicles 22 and 23, the block 24 would be moved the distance that separates the forward vehicle 23 from the rear vehicle 22. Therefore, the vehicles would move at twice that distance so that the rear vehicle 22 would then be forward of the previous location of the forward vehicle 23 by the same spacing that separates the two vehicles.

Another modification that will readily suggest itself is that the vehicles could be enlarged to carry more than a single sprinkler 20. In such an instance, it would probably be desirable to have them rolled on wheels rather than slide on runners. However, in such a case it will be remembered that the vehicle 22 is advanced by the pliable pipe 18 which connects to it and that also the loop that is in the pliable pipe is kept on the advanced side of the vehicle. If the pliable pipe 18 is allowed to trail behind the vehicle, the loop will act as a seine to drag up all loose debris from the surface of the field.

Often it might be desirable to operate with only one sprinkler 20 to each pliable pipe 18, and at other times the farmer might desire to have four or five sprinklers per pipe. In such a case a slow rate of water could be applied, more resembling a drizzle than a rain.

It will be apparent that the embodiments shown are only exemplary and that various modifications can be made in construction, materials, and arrangement within the scope of the invention as defined in the appended claims.

I claim as my invention:

1. An irrigation unit comprising: prime mover; a pump connected in power transmission relationship to the prime mover; a header connected in fluid conducting relationship to the pump; a plurality of parallel pliable pipes connected to and extending from the header; a vehicle for each pliable pipe; a sprinkler attached on each vehicle; each sprinkler connected along its pliable pipe; said pliable pipes being means for conveying water under pressure to each sprinkler; said pliable pipes being means for moving each of said vehicles and attached sprinklers, a traveling pulley on each pliable pipe, a cable on each traveling pulley, and means interconnecting the prime mover and cables for drawing the cables in thus moving the vehicles; so that the one prime mover supplies both power for the water to the sprinkler and power to move the sprinkler.

2. An irrigation system comprising, a header to be positioned on the ground of a field to be irrigated, at least one laterally extending pipe connected at one end to said header, said lateral pipe being constructed of pliable, flexible material, at least one sprinkler connected to said lateral pipe which when in starting position is remote from said header connection, said lateral pipe having a forward U-shaped loop portion in advance of said header and a trailing portion rearward of said header, said sprinkler connected to said trailing portion, means engaging the bend of said U-shaped loop portion for moving the bend of said loop portion forward and away from said header thereby increasing said loop portion and decreasing said trailing portion while advancing said sprinkler towards said header to thereby irrigate the area of said field traversed by said sprinkler.

3. An irrigation system as in claim 2 and having a plurality of lateral pipes and sprinklers, said pipes being parallel to each other and connected at one end to said header.

4. An irrigation system as in claim 2 and having a sled secured to said trailing portion of said lateral pipe, said sprinkler mounted on said sled.

5. An irrigation system as in claim 2 and wherein said means includes a pulley engaging the bend of said loop portion, and a cable connected to said pulley, and means for drawing in said cable.

6. An irrigation system as in claim 2 and wherein said means includes a pulley engaging the bend of said loop portion, and a cable connected to said pulley, and a winch for drawing in said cable.

7. An irrigation system as in claim 2 and having a plurality of lateral pipes and sprinklers, said pipes being parallel to each other and connected at one end to said header, and wherein said means for moving includes a pulley engaging the bend of each loop portion, a series of cables each connected to one of said pulleys and parallel to each other, a second series of pulleys, said cables sheeved on said second series of pulleys, and a single connecting cable for said first mentioned cables, said second series of pulleys being in line, whereby pull upon said single connecting cable will simultaneously move said first mentioned cables about said second series of pulleys thereby advancing said first mentioned pulleys, said loops and said sprinklers.

8. An irrigation system as in claim 7 and having a sled secured to the trailing portion of each of said lateral pipes, and having a plurality of sprinklers connected to each of said lateral pipes.

9. An irrigation system as in claim 2 and having a plurality of lateral pipes and sprinklers, said pipes being parallel to each other and connected at one end to said header, and wherein said means for moving includes a pulley engaging the bend of each loop portion, a series of cables each connected to one of said pulleys and parallel to each other, a second series of pulleys, said cables sheeved on said second series of pulleys, and a single connecting cable for said first mentioned cables, said second series of pulleys being in line, whereby pull upon said single connecting cable will simultaneously move said first mentioned cables about said second series of pulleys thereby advancing said first mentioned pulleys, said loops and said sprinklers; and a plurality of sleds secured to the trailing portion of each of said lateral pipes.

10. An irrigation system as in claim 9 and having at least one sprinkler mounted on each of said sleds.

11. An irrigation system as in claim 2 and having a sled secured to the trailing portion of said lateral pipe, said sprinkler mounted on said sled, said sled having a fender for preventing fouling.

12. An irrigation system comprising: a header extending along the ground through the field to be irrigated, a plurality of pliable pipes extending from said header, said pliable pipes constructed of a pliable material, a sprinkler connected along each pliable pipe away from said header, each of said sprinklers being means for discharging water to a considerable distance from the sprinkler, a vehicle for each pliable pipe, each of said sprinklers being mounted on one of said vehicles, each of said vehicles being attached to its said pliable pipe so that as the pliable pipe is moved the vehicle and thus the sprinkler is moved with it, a plurality of traveling pulleys, each of said pliable pipes reeved through a traveling pulley, a lateral cable attached to each traveling pulley, the lateral cable extending aligned to the pliable pipe, a set of staked pulleys aligned parallel to said header, each of said staked pulleys attaching to a stake set in the ground, each of the lateral cables extending from a traveling pulley and reeved around a staked pulley, and a master cable, each of said lateral cables attached to said master cable after it has been reeved around one of the staked pulleys.

13. The invention as defined in claim 12 with the addition of means for drawing in the master cable thus moving the lateral cables and the sprinkler vehicles.

14. The invention as defined in claim 13 with the addition of a prime mover, a pump connected to the prime mover, the pump connected to said header, and the prime mover connected to a winch, said master cable wound on the winch; so that the prime mover supplies power for both water pressure and sprinkler moving.

15. An irrigating sled comprising: two tubular runners connected together at front to form a U-shaped frame, the rear portion of the runners generally parallel adapted to lie flat on the ground, the front portion turned up at an angle; the turned up portion and forward part of the flat portion having a sheet metal bottom attached thereto so that about the front half of the total length of the frame has a sheet metal bottom and the rear half is open; a cross bar transversely attached to the runners about midpoint the total length; a T conduit attached to the cross bar, the T having three connections, one connection pointing forward the sled, one connection rearward of the sled, and one connection upward; a sprinkler attached to the upward connection; and the sheet metal bottom of the forward turned up portion having a hole therein; said hole being aligned with the forward pointing connection of the T conduit; a pair of feelers attached to the forward point of the frame, said feelers extending rearwardly to either side of the sprinkler, said feelers being adjustably attached to the frame as to height and width; so that a pliable pipe may be connected to the forward connection, extended through the hole and used to move the sled.

16. The invention as defined in claim 15 with the addition of a hemi-cylindrical fender attached along the curved forward portion of the frame, the axis of said fender being normal to the angled up portion of the frame, the fender correlative to and smoothly connected to the curve of the forward portion of the frame.

17. An irrigation sled comprising: a sprinkler, said sprinkler attached to a T conduit, said sprinkler attached to a connection of the T conduit extending vertically upward, a flexible hose connected to a horizontal connection of said T conduit, said T conduit having another horizontal connection adapted to be connected to another flexible conduit, a pair of feelers attached to the sled at the forward part thereof, each of said feelers being a spring steel rod which extends outward, and each of said feelers being curved so that it is parallel to the longitudinal axis of said sled, means interconnecting said feelers and said sled for adjusting said feelers vertically and horizontally; so that said feelers prevent vegetation from fouling the sprinkler, also so that the feelers maintain the sprinkler in an upright position.

18. An irrigation system comprising:
   (a) a header positioned on the ground of a field to be irrigated,
   (b) a plurality of laterally extending pipes,
   (c) each laterally extending pipe connected at one end to the header,
   (d) said laterally extending pipes constructed of pliable, flexible material,
   (e) at least one sprinkler connected to each laterally extending pipe,
   (f) each sprinkler when in starting position remote from said header connection,
   (g) each laterally extending pipe having a forward U-shaped loop portion in advance of said header and a trailing portion rearward of said header,
   (h) said sprinkler connected to said trailing portion, so that when the bend of the U-shaped loop portion of each laterally extending pipe is moved forward and away from said header, the loop portion is increased and the trailing portion decreased thus advancing said sprinkler toward said header to thereby irrigate the area of said field traversed by said sprinkler.

19. The method of agricultural irrigation comprising:
   (a) extending a header along the ground of a field to be irrigated,
   (b) extending a plurality of pliable pipes from the header,
   (c) extending said pipes in parallel relationship to one another, and at right angles to said header,
   (d) supplying water under pressure to said header and discharging water from each of said pliable pipes, thus irrigating the field,
   (e) periodically moving the discharging end of said pliable pipes by pulling the pliable pipes axially while leaving the header in its original position,
   (f) the first time that each pliable pipe is moved forming a U-shaped loop in each pliable pipe,
   (g) thereafter increasing the U-shaped loop portion so that there is an increased portion of pliable pipe which is looped back upon itself and a decreased trailing portion extending beyond the header.

References Cited in the file of this patent

UNITED STATES PATENTS

| | | |
|---|---|---|
| 590,780 | Travis | Sept. 28, 1897 |
| 2,174,600 | Schutmaat | Oct. 3, 1939 |
| 2,226,668 | Newman | Dec. 31, 1940 |
| 2,602,696 | Salatin | July 8, 1952 |
| 2,683,056 | Hilfinger | July 6, 1954 |
| 2,796,292 | Maggart | June 18, 1957 |
| 2,889,948 | Leuenberger | June 9, 1959 |